Feb. 10. 1925.
J. R. McALLISTER
1,525,683
CLUTCH OPERATING DEVICE FOR TRACTORS
Filed Sept. 22, 1923
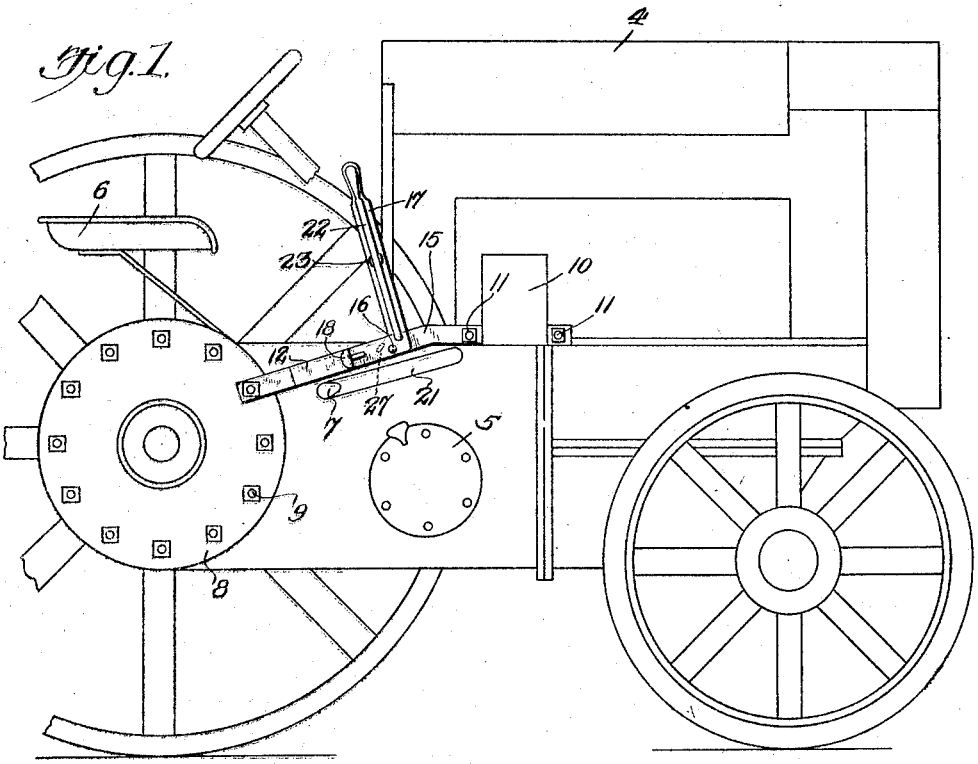
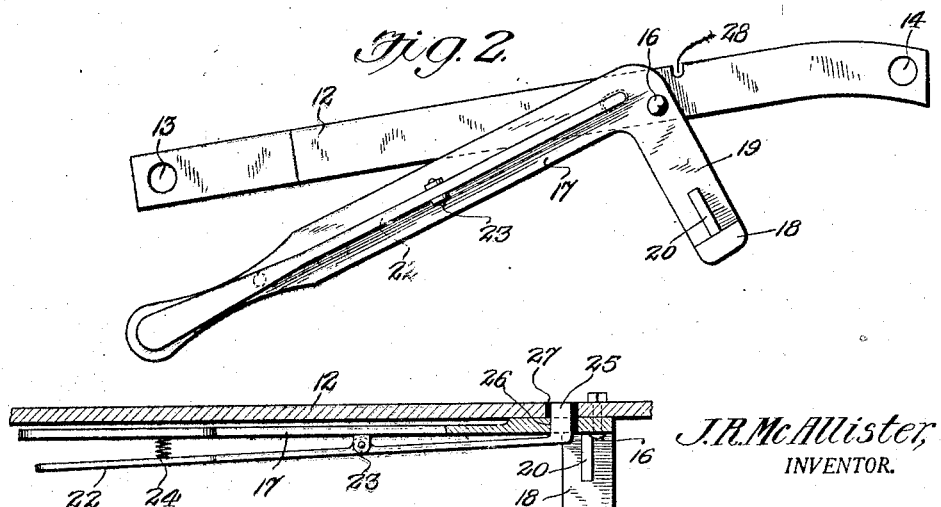
J. R. McAllister,
INVENTOR.
BY Arthur H. Sturges.
ATTORNEY.

Patented Feb. 10, 1925.

1,525,683

UNITED STATES PATENT OFFICE.

JOHN R. McALLISTER, OF DOWS, IOWA.

CLUTCH-OPERATING DEVICE FOR TRACTORS.

Application filed September 22, 1923. Serial No. 664,175.

*To all whom it may concern:*

Be it known that I, JOHN R. MCALLISTER, a citizen of the United States, residing at Dows, in the county of Wright and State of Iowa, have invented certain new and useful Improvements in Clutch-Operating Devices for Tractors, of which the following is a specification.

The present invention relates to improvements in clutch operating device in which provision is made for holding the clutch pedal in the lowered or disconnected position without requiring that the operator's foot be kept upon the pedal.

An object of the invention is to provide a mechanism in the nature of an attachment for tractors which will cooperate with the usual tractor construction whereby to be mounted thereon without additional fastenings and in which the clutch pedal will be entirely free of the operating device during the normal running of the tractor.

A further object of the invention resides in providing a device which will act to depress the clutch pedal and to hold it depressed while the engine is running for the purpose of driving the machinery.

Other objects are to simplify the construction, to make the device efficient and ready in operation and to avoid the device jarring loose by reason of the vibration of the tractor.

With the foregoing and other objects in view, the invention will be more fully described hereinafter, and will be more particularly pointed out in the claim appended hereto.

In the drawings, wherein like symbols refer to like or corresponding parts throughout the several views, Figure 1 is a side view of a tractor with one wheel removed showing the improved clutch operating device applied thereto.

Figure 2 is an enlarged side view of the device removed from the tractor and in the lowered position, and Figure 3 is a longitudinal section taken through the device with parts shown in plan.

Referring more particularly to the drawings 4 designates generally a tractor and 5 the cover at the side for the power take-off shaft by which threshing and other machinery may be driven by the tractor while the same remains motionless.

During the driving of such machinery by the power take-off shaft, an operator is required to remain in the seat 6 with his foot held down upon the clutch pedal 7 in order to avoid driving the tractor it being understood that the clutch pedal is normally held in the raised position by a spring associated therewith.

The axle housing plate is shown at 8, the same being secured by the bolts 9 in position and 10 represents the carbureter secured by the fastenings 11 to the tractor.

In accordance with the present invention I provide a bar 12 of appropriate length to extend substantially from the carbureter to the axle housing, the ends of this bar being perforated as indicated at 13 and 14 in Figure 2. The bolts 9 and 11 are passed through these perforations and the bar is thus secured in place. This bar is bent as indicated at 15 in order to bring the major portion thereof above and in substantial parallelism with the clutch pedal 7 and the clutch arm which supports it. To an intermediate part of the bar 12 is pivoted as indicated at 16 an L-shaped lever 17. The longer arm of the lever is adapted to normally extend upwards so as to be within the convenient grasp of the operator occupying the seat 6 and the upper end of this lever arm is formed to the shape of the hand. The shorter lever arm extends in substantial registry with the bar 12 when in normal or raised position and at its free end is provided with an out-turned flange or foot 18. In the angle between the flange or foot and the shorter arm 19 of the lever there is a strengthening web 20 which transmits strains devolving on the foot to the short arm 19 and this web avoids the bending or distortion or other displacement of the foot. The foot is rounded upon its lower corners as indicated in order to slide freely over the clutch arm 21 while the sole of the foot is flat in order to lie in contact with a substantial area of the clutch arm when engagement is set up between these two parts. It will be noted that the pivot 16 is just slightly off set from the corner portion of the lever and that the longer arm or handle of the lever is provided with a latch lever 22 fulcrumed intermediately as indicated at 23 and extending longitudinally of the longer arm, such latch lever swinging in a plane at substantially right angles to the swinging plane of the lever 17. The handles of the two levers are located side by side so that in squeezing the latch lever the operator may simultaneously grasp the main lever and accomplish the swinging of the lever immediately subsequent to the release of the latch. A coil spring 24 is located between the two levers near the handle portions in order to normally separate the same and a dog 25 is provided at the opposite end of the latch lever, which dog slides through an opening 26 in the main lever and is adapted to enter a slot 27 in the bar 12 for the purpose of locking the main lever in the lowered or depressed position.

The bar 12 has a notch 28 in its upper edge opening through such upper edge rearwardly of the pivot point 16 and in position to receive the lower edge of the dog 25 when the main lever is raised as indicated in Figure 1.

The normal position of the lever is that shown in Figure 1 in which the lever handle is raised and the foot is out of contact with the clutch arm or pedal. The device in this position interferes in no wise with the normal operation of the tractor, and the clutch may be freely released and engaged by the foot.

However when machinery is to be driven by the tractor, the main lever is swung down to the position shown in Figure 2, the latch being previously disengaged to permit this movement. In the lowered position the dog 25 engages the slot 27 and the lever is held with its foot 18 depressing the clutch. The dog 25 is surrounded on all sides by the walls of the bar 12 about the slot 27 and the spring 24 acting at right angles to the path of movement of the main lever will prevent disengagement casually or accidentally through the jarring or vibration incident to the operation of the engine.

When in the raised position the edge of the dog 25 will engage in the notch 28 and hold the parts against vibration or accidentally dropping down.

I do not wish to be restricted to the size, form, and proportions of the various parts, and obviously changes could be made in the construction herein described without departing from the spirit of the invention, it being only necessary that such changes fall within the scope of the appended claim.

What is claimed is:—

A clutch operating device for tractors comprising a bar adapted to be attached to the tractor above the clutch pedal and arm, said bar having a notch in its upper edge and a slot transversely between its upper and lower edges and spaced from said notch, a lever fulcrumed to the bar between said slot and notch and having a part adapted to engage with the clutch arm, said lever having a transverse opening therein adapted to register with the slot in said bar, and a latch lever fulcrumed on said lever to swing at substantially right angles thereon and having a dog slidable transversely through the opening and slot and adapted to engage in said notch in the raised position of the lever.

In testimony whereof, I have affixed my signature in presence of two witnesses.

JOHN R. McALLISTER.

Witnesses:
L. C. McGRATH,
VIOLA E. SCHINEGER.